(12) United States Patent
Kampitsch

(10) Patent No.: US 9,625,100 B2
(45) Date of Patent: Apr. 18, 2017

(54) STORAGE CONTAINER FOR CRYOGENIC PRESSURIZED GAS HAVING A STORAGE VOLUME

(71) Applicant: Bayerische Motoren Werke Aktiengesellschaft, Munich (DE)

(72) Inventor: Markus Kampitsch, Neukeferloh (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 14/457,865

(22) Filed: Aug. 12, 2014

(65) Prior Publication Data

US 2014/0346178 A1    Nov. 27, 2014

Related U.S. Application Data

(63) Continuation of application No. PCT/EP2012/074276, filed on Dec. 3, 2012.

(30) Foreign Application Priority Data

Feb. 13, 2012 (DE) .......... 10 2012 20 2146

(51) Int. Cl.
| | |
|---|---|
| F17C 3/04 | (2006.01) |
| F17C 13/00 | (2006.01) |
| F17C 13/02 | (2006.01) |
| B60K 15/03 | (2006.01) |

(52) U.S. Cl.
CPC ...... *F17C 13/001* (2013.01); *B60K 15/03006* (2013.01); *F17C 3/04* (2013.01); *F17C 13/026* (2013.01); *F17C 2201/0109* (2013.01); *F17C 2201/056* (2013.01); *F17C 2203/03* (2013.01); *F17C 2203/0629* (2013.01); *F17C 2221/012* (2013.01); *F17C 2223/0115* (2013.01); *F17C 2223/036* (2013.01); *F17C 2223/041* (2013.01); *F17C 2250/0439* (2013.01); *F17C 2250/0491* (2013.01); *F17C 2260/056* (2013.01); *F17C 2265/022* (2013.01); *F17C 2270/0168* (2013.01); *Y02E 60/321* (2013.01)

(58) Field of Classification Search
CPC ........................................................ F17C 3/04
USPC ...... 366/289, 332; 220/560.04, 560.1–560.12
See application file for complete search history.

(56) References Cited

U.S. PATENT DOCUMENTS

| | | | | |
|---|---|---|---|---|
| 2,498,393 | A | * | 2/1950 | Clewell ............... 366/274 |
| 2,545,240 | A | * | 3/1951 | Patoe .................. 241/69 |
| 2,808,238 | A | * | 10/1957 | Spitler ................. 366/123 |

(Continued)

FOREIGN PATENT DOCUMENTS

| | | |
|---|---|---|
| CN | 201010650 Y | 1/2008 |
| CN | 102216154 A | 10/2011 |

(Continued)

OTHER PUBLICATIONS

International Search Report dated Mar. 1, 2013 (Two (2) pages).

(Continued)

*Primary Examiner* — David Sorkin
(74) *Attorney, Agent, or Firm* — Crowell & Moring LLP

(57) ABSTRACT

In the case of a storage vessel of cryogenic gas or cryogenic compressed gas, particularly a cryo-pressure tank for a motor vehicle, having a storage volume for accommodating the stored gas, a mixing device is provided in the storage volume for mixing the gas stored in the storage volume.

18 Claims, 1 Drawing Sheet

(56) References Cited

U.S. PATENT DOCUMENTS

| | | | | |
|---|---|---|---|---|
| 3,521,458 | A * | 7/1970 | Huibers et al. | 62/54.1 |
| 5,081,761 | A * | 1/1992 | Rinehart et al. | 29/428 |
| 5,548,961 | A | 8/1996 | Luger et al. | |
| 7,441,941 | B2 * | 10/2008 | Vernon | 366/130 |
| 2001/0019061 | A1 * | 9/2001 | Ettlinger | 220/651 |
| 2005/0139600 | A1 * | 6/2005 | Harper et al. | 220/560.13 |

FOREIGN PATENT DOCUMENTS

| | | |
|---|---|---|
| DE | 43 42 210 A1 | 6/1995 |
| DE | 10 2008 052 876 A1 | 4/2010 |
| FR | 2 938 498 A1 | 5/2010 |
| JP | 2009-243675 A | 10/2009 |
| WO | WO 99/41164 A1 | 8/1999 |
| WO | WO 2010/046041 A1 | 4/2010 |

OTHER PUBLICATIONS

German-language Search Report dated Jan. 31, 2013, with partial English translation (Ten (10) pages).

Chinese Office Action dated Jan. 7, 2015 with English translation (10 pages).

* cited by examiner

STORAGE CONTAINER FOR CRYOGENIC PRESSURIZED GAS HAVING A STORAGE VOLUME

CROSS REFERENCE TO RELATED APPLICATIONS

This application is a continuation of PCT International Application No. PCT/EP2012/074276, filed Dec. 3, 2012, which claims priority under 35 U.S.C. §119 from German Patent Application No. 10 2012 202 146.9, filed Feb. 13, 2012, the entire disclosures of which are herein expressly incorporated by reference.

BACKGROUND AND SUMMARY OF THE INVENTION

The invention relates to a storage vessel of cryogenic gas, including compressed cryogenic gas, particularly a cryo-pressure tank for a motor vehicle, having a storage volume for accommodating the stored gas. The invention further relates to a use of such a storage vessel in the case of a motor vehicle.

For operating motor vehicles by means of hydrogen as the fuel, gas is stored in a supercritical state in a special compression-proof vessel. In this case, the cryogenic gas is stored at a high pressure (13 bar to 350 bar) in the gaseous state. For this purpose, it has to be avoided that heat is carried from the environment into the storage vessel. The storage vessel therefore requires a very good, as a rule, double-walled super-insulation with a high vacuum.

When filling or refueling such a storage vessel with cryogenic gas, its storage content also has to be maintained at a sufficiently low temperature. Furthermore, the temperature prevailing in the storage vessel has to be measured in a precise manner at expenditures that are as low as possible.

According to the invention, a storage vessel of cryogenic compressed gas, particularly a cryo-pressure tank for a motor vehicle, is created, which has a storage volume for accommodating the stored gas. A mixing device for mixing the gas stored in the storage volume is provided in the storage volume.

The solution according to the invention is based on the recognition that, when refueling a conventional cryo-pressure tank, a thermal layering occurs in the stored supercritical gas immediately after the refueling. This means that warm gas accumulates in the upper area of the storage volume and colder gas accumulates in the lower area of the storage volume. For determining levels of the storage volume by means of the measured quantities of pressure and temperature, a very precise measurement of the average temperature of the stored gas would be required which, in the case of such a layering, would be possible only at higher expenditures, for example, by use of several temperature sensors.

Instead, the mixing device according to the invention for mixing the gas stored in the storage volume results in a mixing of the above-mentioned layering and in making the temperature of the stored gas uniform also during and immediately after the refueling. The temperature of the gas can therefore be measured in a highly precise manner in the case of the storage vessel according to the invention, even by use of only one temperature sensor. Furthermore, the solution according to the invention avoids that tensions could occur at the wall or housing of the storage vessel because of regionally different temperatures. Such tensions could reduce the service life expectancies of the storage vessel.

The mixing device according to the invention is particularly preferably designed with a movably disposed body. Such a body can be moved actively or passively. By means of the movement, the body displaces gas in front of it in the storage volume, while simultaneously gas can flow in at the rear at the body. As a result, a flow is generated in the gas which contributes to the mixing of the gas.

It is particularly advantageous to dispose the movably disposed body in a displaceable manner. The displaceable bearing can be implemented in a constructively very simple fashion, and simultaneously results in a wide range of motion for the body in the, as a rule, elongated storage volume required for the storage vessel.

The displaceable bearing of the movably disposed body is preferably oriented in the longitudinal direction of the pertaining vehicle. Because of its constant acceleration and braking during the driving operation, the vehicle experiences its strongest inputs of impulses in its main driving direction. These impulses may advantageously be utilized for the movement of the body used according to the invention as the mixing device. In that the body provided according to the invention is displaceably disposed toward the longitudinal vehicle direction, it is subjected in this moving direction to the acceleration impulses acting upon it by way of the vehicle. Simultaneously, the body is subjected to its inertia and to a certain friction at its bearing. This interaction of the acceleration impulse, the inertia and the friction has the result that the body is moving again and again relative to its bearing and, as a result, contributes to a mixing of the gas stored in the storage vessel.

Particularly preferably, the movably disposed body is additionally or exclusively disposed in a swivelable manner. By way of such a bearing, a swiveling motion of the body is defined, which may be directed back and forth in the manner of a pendulum or may be oriented in the manner of a circular path or a helical path over an at least longer distance in one rotating direction. The swiveling motion can be carried out in a simple manner and can be utilized in a targeted fashion in order to generate a conveying motion in the storage volume, which results in a whirl-type mixing of the gas.

It is further advantageous according to the invention for the movably disposed body to be disposed in a freely movable manner. In the case of a movement triggered by means of an impulse transmission, the free mobility leads to particularly large movement amplitudes. After a distance of free mobility, these movements can be braked in a targeted manner particularly by way of elastic elements and may also be reversed in the opposite direction.

Furthermore, the movably disposed body is preferably designed as a disk penetrating the storage volume. The disk has a large face by which it can be moved through the storage volume. When it is moved in this manner, it results in a large volume displacement while the moving path is short.

A further preferred shape of the body movably disposed according to the invention is that of a pendulum. The pendulum has a mass body which is linked to a pivot bearing by way of a comparatively low-mass rod. The mass body creates a large mass moment of inertia while the overall mass of the arrangement is comparatively low. This comparatively low overall mass is advantageous specifically with respect to the weight restrictions existing in the field of vehicle construction.

The movably disposed body is further preferably designed with at least one through-opening. The through-opening creates a duct through which a partial flow can enter, while, another partial flow is pushed along in front of the rest of the body. Thereby, partial flows are formed, which are oriented in opposite directions and together result in an advantageous swirling of the stored gas.

With the thus created advantages, the invention correspondingly is also aimed in a targeted manner at a use of such a storage vessel in a motor vehicle.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
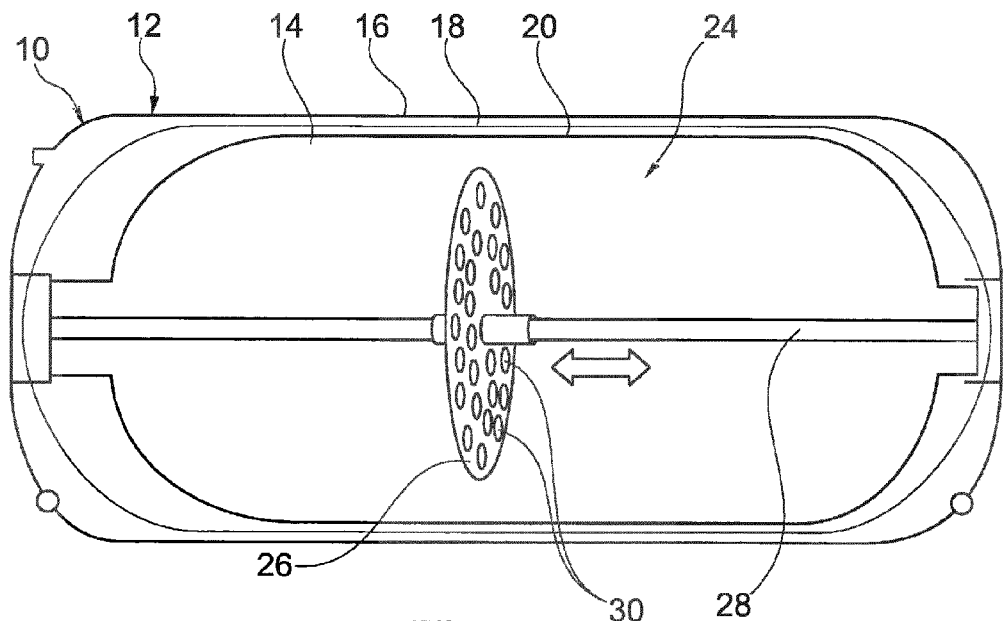
FIG. 1 is a longitudinal sectional view of a first embodiment of a storage vessel according to the invention.

The figures illustrate embodiments of storage vessels 10 for compressed hydrogen gas ($CcH_2$, cryo-compressed $H_2$), so-called cryo-pressure tanks. The cryogenic gas stored therein is suitable for any type of $H_2$ energy converter and is preferably used for driving a fuel cell of a vehicle (not shown in detail). For this purpose, the gas is removed from the storage vessel 10 and is supplied to the fuel cell.

The $CcH_2$ is stored in the storage vessel 10 at a very low temperature at a supercritical pressure. For this purpose, the storage vessel 10 has an exterior tank or storage housing 12, which encloses a storage volume 14 for accommodating the gas in a fluid-tight manner. The storage housing 12 is formed by way of an outer shell 16, an insulation 18 arranged therein, and an interior tank or an interior storage wall 20.

So that a temperature (thermal) layering of the stored gas is avoided particularly in the storage vessel 12, a mixing device 24 is provided in the storage volume 14. This mixing device 24 is used for mixing the gas stored in the storage volume 14 and, in this manner, causes a swirling and circulating of the gas, so that the latter does not form any layering. The temperature of the stored gas thereby becomes uniform also during and immediately after the refueling of the storage vessel. In the case of the storage vessel 10, the temperature of the gas can therefore be measured in a highly precise manner only by use of a single temperature sensor (not shown).

In the embodiment according to FIG. 1, the mixing device 24 is designed with a movably disposed body 26 which is displaceably arranged on a rod 28. The rod 28 forms a displacement bearing for the body 26, on which displacement bearing, the body can be moved freely in a passive fashion. When moving, the body 26 displaces gas in front of it in the storage volume 14, while, at the same time, gas can flow in at the rear at the body 26. In this case, the body 26 is designed in the shape of a disk with several through-openings arranged in the face in a distributed manner. During the back-and-forth motion of the body 26, the gas flows partially through these through-openings 30, which, on the whole, causes an advantageous swirling and mixing of the gas.

The rod 28 is positioned in the storage vessel 10 such that, in the installed condition, it extends in the longitudinal direction of the pertaining vehicle. During the acceleration and braking of the vehicle, the vehicle transmits motion impulses to the rod 28/body 26 system, in which case one of the two components 26/28 is moved, while the other counters this motion because of its inertia. Thus, without requiring a separate drive, this results in a relative motion between the rod 28 and the body 26 and the thereby desired mixing of the gas in the storage volume 14.

Figure 2:
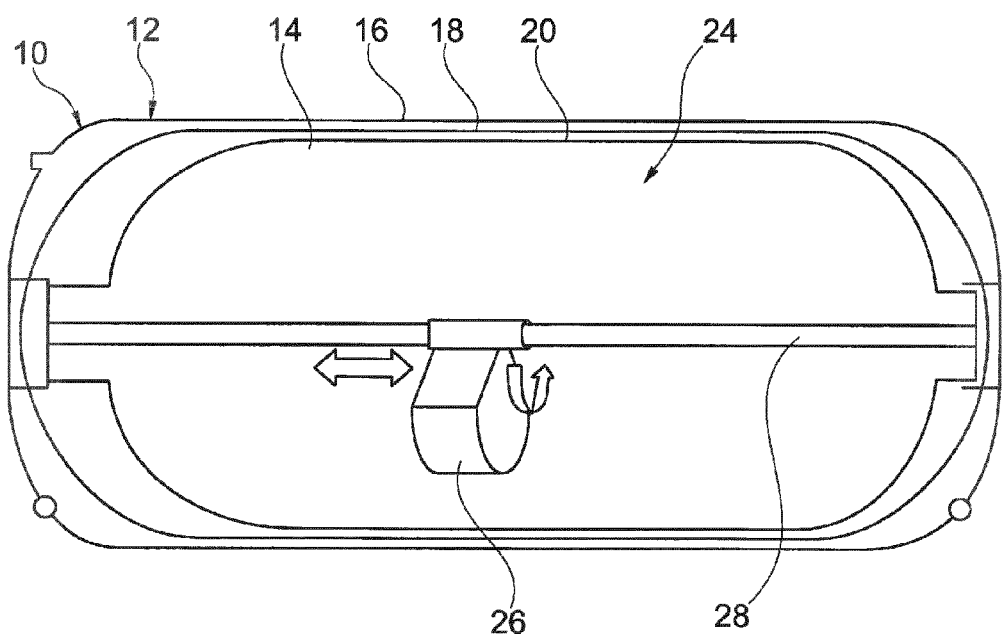
FIG. 2 is a longitudinal sectional view of a second embodiment of a storage vessel according to the invention.

In the embodiment according to FIG. 2, the body 26 is designed as a pendulum, which, in addition to the displaceable bearing along the rod 28, can also swivel about the rod 28. The swiveling motion of the pendulum also occurs automatically when the rest of the vehicle surrounding the body 26 is moved relative to this body 28.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motor vehicle, comprising:
   a storage vessel having outer and inner walls and insulation arranged therebetween and a storage volume within the inner wall accommodating cryogenic gas or cryogenic compressed gas;
   a mixing device arranged in the storage volume, the mixing device having a movably disposed body in the storage volume for mixing gas stored in the storage volume; and
   a fixed support arranged within the storage volume between a region adjacent to a first longitudinal end of the storage volume to a region adjacent to a second longitudinal end of the storage volume and parallel to a longitudinal axis of the storage volume,
   wherein the movably disposed body is supported by the fixed support within the storage volume and the movably disposed body is linearly displaceable along the fixed support parallel to the longitudinal axis of the storage volume in response to motion of the storage vessel during operation of the motor vehicle.

2. The motor vehicle according to claim 1, further comprising:
   a displaceable bearing of the movably disposed body on which the linearly displaceable movably disposed body is supported by the fixed support in the storage volume, the displaceable bearing being oriented in a longitudinal direction of the motor vehicle.

3. The motor vehicle according to claim 1, wherein the movably disposed body is swivelably arranged on the fixed support in the storage volume.

4. The motor vehicle according to claim 2, wherein the movably disposed body is swivelably arranged on the fixed support in the storage volume.

5. The motor vehicle according to claim 1, wherein the movably disposed body is arranged in a freely movable manner.

6. The motor vehicle according to claim 2, wherein the movably disposed body is arranged in a freely movable manner.

7. The motor vehicle according to claim 1, wherein the movably disposed body has a disc-shape.

8. The motor vehicle according to claim 2, wherein the movably disposed body has a disc-shape.

9. The motor vehicle according to claim 1, wherein the movably disposed body is in a pendulum form having a mass body linked to a pivot bearing via a rod.

10. The motor vehicle according to claim 1, wherein the movably disposed body includes at least one through-opening.

11. The motor vehicle according to claim 7, wherein the movably disposed body includes at least one through-opening.

12. The motor vehicle according to claim 9, wherein the movably disposed body includes at least one through-opening.

13. A storage vessel for a motor vehicle, comprising:
a cryogenic storage tank having outer and inner walls and insulation arranged therebetween and accommodating cryogenic gas or cryogenic compressed gas in a storage volume thereof;
a mixing body arranged in the storage volume, the mixing body being movably disposed in the storage volume to mix gas stored therein;
a fixed support arranged within the storage volume between a region adjacent to a first longitudinal end of the storage volume to a region adjacent to a second longitudinal end of the storage volume and parallel to a longitudinal axis of the storage volume,
wherein the mixing body is supported by the fixed support within the storage volume and the movably disposed body is linearly displaceable along the fixed support parallel to the longitudinal axis of the storage volume in response to motion of the storage vessel.

14. The storage vessel according to claim 13, wherein the mixing body includes a displaceable bearing on which the linearly displaceable movably disposed body is supported by the fixed support in the storage vessel, the displaceable bearing being oriented in a longitudinal direction of the motor vehicle.

15. The storage vessel according to claim 13, wherein the mixing body is disposed in a swivelable manner in the storage volume.

16. The storage vessel according to claim 14, wherein the movable body is in a disc-shape.

17. The storage vessel according to claim 14, wherein the movable body is configured as a pendulum displaceable in the longitudinal direction and swivelable on the fixed support about a longitudinal axis.

18. The storage vessel according to claim 16, wherein the mixing body comprises at least one through-opening configured to facilitate mixing of the gas upon displacement of the mixing body.

* * * * *